March 2, 1954  R. S. SEGSWORTH  2,671,160
METHOD AND APPARATUS FOR HEATING STACKED PLATES
Filed June 13, 1952  2 Sheets-Sheet 1

Inventor
ROBERT S. SEGSWORTH
by: Fetherstonhaugh & Co.
Attys.

March 2, 1954 R. S. SEGSWORTH 2,671,160
METHOD AND APPARATUS FOR HEATING STACKED PLATES
Filed June 13, 1952 2 Sheets-Sheet 2
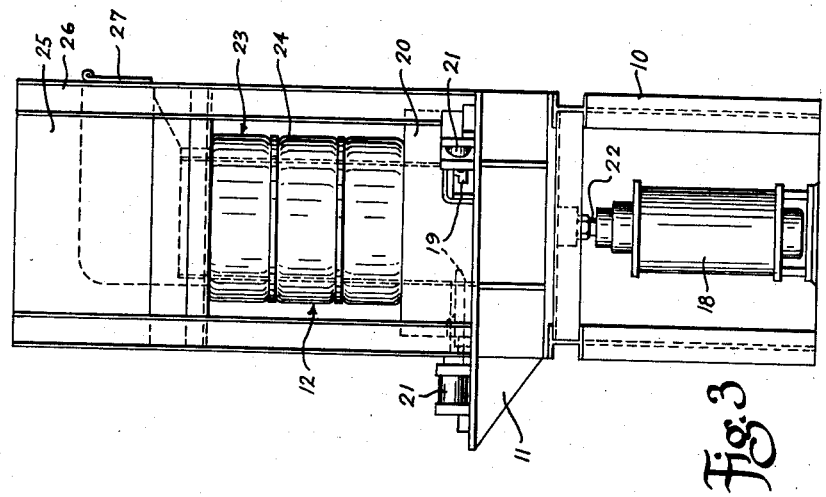
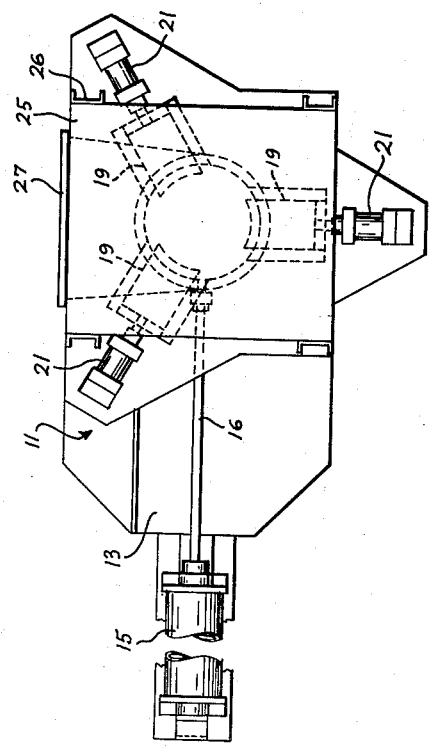
Inventor
ROBERT S. SEGSWORTH
by: Fetherstonhaugh & Co.
Att'ys Patented Mar. 2, 1954

2,671,160

UNITED STATES PATENT OFFICE 2,671,160

METHOD AND APPARATUS FOR HEATING STACKED PLATES

Robert Sidney Segsworth, Toronto, Ontario, Canada, assignor to The General Engineering Company (Canada) Limited, Toronto, Ontario, Canada Application June 13, 1952, Serial No. 293,275

4 Claims. (Cl. 219—10.41)

This invention relates to method and apparatus for heat treating stacked plates.

This application is co-pending with my applications filed on even date herewith:

Dual Frequency Induction Heating Method, Serial No. 293,273.

The induction heating of elongated travelling non-magnetic material such as, for example, coilable strip, by the use of transverse magnetic flux has been shown by Baker, United States Patent 2,448,009, August 31, 1948, an earlier Baker Patent 2,408,190, September 24, 1946, being illustrative of the state of the art in respect to induction heating techniques in general and in particular, magnetic induction heating.

In many cases it may be desired to heat treat a continuous strip such as illustrated in the manner of the later Baker patent or the patent to Northrup 1,912,214, May 30, 1933, and to cause plates to be struck from the travelling strip either immediately after heating or after the complete heat treatment. Prior methods and apparatus of the types above discussed are unwieldy when the desired end product is a series of plates which may be cut from a strip and which are of identical character such as, for example, a series of coins or a series of forged discs for disc harrows.

Accordingly, it is the main object of the invention to provide method and apparatus for heat treating a plurality of stacked plates of substantially uniform dimensional characteristics through the medium of transverse magnetic flux, that is, transversely of the major dimension of each of the plates but in the same direction as the direction of movement as the stacked plates. Thus, the magnetic flux lines pass through each plate in the direction of the plate thickness or substantially normal or perpendicular to the wide faces or sides of each plate.

It is another object of the invention to provide a furnace for heating a plurality of stacked plates of substantially similar dimensional characteristics wherein each plate is relatively thinner than its width and wherein the stacked plates may be conducted as a stacked unit through the open core of an induction heating coil.

It is also an object of the invention to provide transverse flux induction heating for stacked plates of magnetic or non-magnetic material. The range of frequencies contemplated is of the same order contemplated in the Baker Patent 2,448,009.

Other objects of the invention in addition to the foregoing will be appreciated from a study of the following specification taken in conjunction with the accompanying drawings, wherein some details or parts are omitted or are shown schematically for clarity of illustration and description.

In the drawings:

Figure 2 is a plan view of Figure 1.

Figure 3 is an end view of the apparatus of Figure 1.

Figure 1:
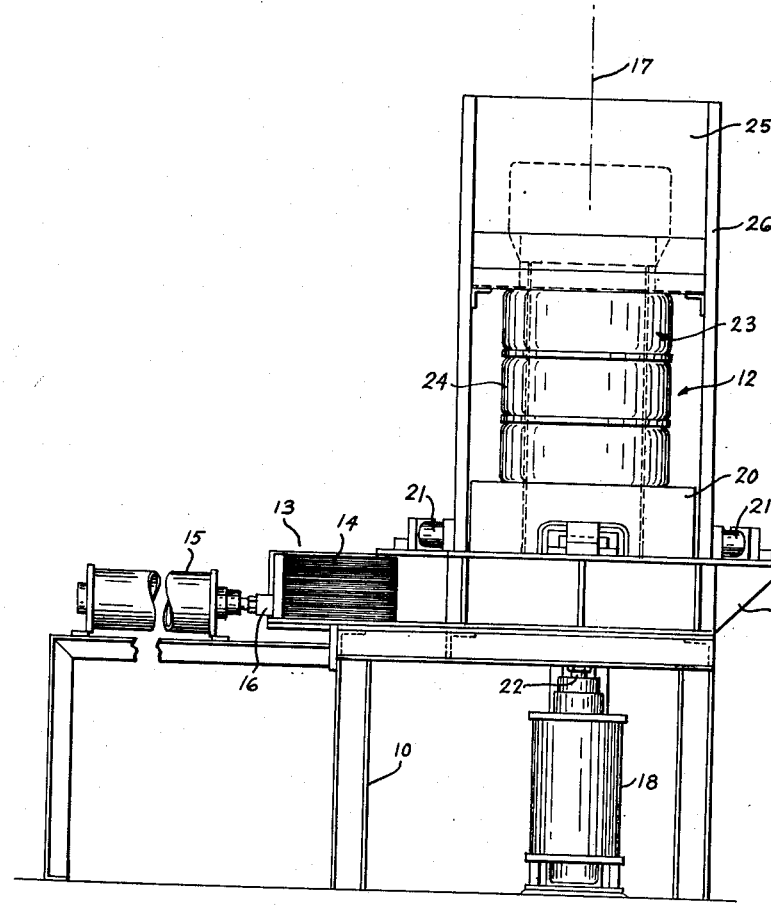
Figure 1 is an elevation of heat treating apparatus for stacked plates according to the invention.

Referring to the drawings, the heat treating apparatus comprises a supporting frame 10 carrying a loading mechanism 11 above which is disposed a furnace unit 12. The loading mechanism includes a receiver opening 13 into which a series of stacked plates of a predetermined height representing a unit 14 of stacked plates is set by an operator. A loading cylinder 15 which may be air driven has a ram 16 designed to move the unit 14 into a position in alignment with the axis 17 of the furnace unit 12. The feed cylinder 18, which may be the hydraulic or pneumatic type, then is actuated by suitable mechanism well known to skilled persons, to cause the unit 14 to move to a position such that the lowermost of the plates in the unit is disposed just above the retractable supporting arms 19 mounted in the refractory coil support 20 and arranged in the manner illustrated in Figure 2. Upon the unit 14 reaching this position, the pneumatic cylinders 21 are actuated to cause the support arms 19 to move inwardly to the position illustrated in Figure 2, immediately after which the ram 22 of the feed cylinder retracts to leave the unit 14 resting upon the arms 19. It will be apparent, therefore, that the loading mechanism 11 will accomplish the loading of stacked plate units one after the other to cause these units to rise in stacked relationship through the open core or heating column 23 of the furnace 12.

The furnace unit is supported by the refractory coil support 20 and comprises a plurality of induction heating coils 24 which are preferably operated at a frequency of 60 cycles per second in the heat treating of metal plates. The fabrication of the coils may be in accordance with practice familiar in the induction heat treating arts or may be formed in accordance with the teachings of the said co-pending applications.

A refractory oven 25 is disposed in supporting frame 26 above the heating coils 24 and includes a door 27 (Figure 3) which may be opened inwardly to allow access to the heated plates within the oven arriving therein after upward travel through the coils 24. After removal from the oven, the stacked plates may be quenched in oil, water, or other suitable quenching means or may be forged while hot, such procedure being particularly adaptable to the formation of harrow discs.

The apparatus may be made fully automatic if desired in accordance with known practice in the construction of automatic systems; for example, the current in the uppermost coil will vary in accordance with the load determined by the temperature of the plates being treated thereby and, accordingly, the current is a measure of the temperature. Thus, a current responsive device may be employed to actuate a warning light and, after a suitable delay period permitting the removal of a stacked unit from the refractory oven, the loading cylinder 15 and the feed cylinder 18 may by relay control valves be automatically and consecutively brought into operation. The pneumatic cylinders 21 may be controlled by electrical limit switch means actuated by the fed stacked plate unit controlling solenoids actuating the air valves thereof. Many suitable schemes will be apparent to skilled persons, any of which do not form a part of this invention which in particular concerns the feeding of stacked plates through an induction heating coil to subject the individual plates to a transverse magnetic flux.

In the present method and apparatus, the magnetic flux passes through the material being heated at right angles to the surface so that the eddy currents generated circulate in the plane of the material rather than in the restricted area of the cross-section. Accordingly, it is possible to select the frequency of the magnetic field generated by the induction heating coils on the basis of the width of the material rather than the thickness. Thus, a stack of plates may be heated by a field of commercial frequency, that is, about sixty cycles. For small discs, such as coins, frequencies may be of the order of three hundred and fifty cycles per second. It will be apparent therefore that in the method and apparatus of the invention the thickness of the plate being heated is not the controlling factor in the selection of frequency, thereby enabling great savings to be accomplished in the costs and complexity of the equipment.

It is intended that the present disclosure should not be construed in any limiting sense other than that indicated by the scope of the following claims.

What I claim as my invention is:

1. The method of simultaneously inductively heating a plurality of substantially identical sheet metal plates with an open core induction heating coil adapted to generate a magnetic flux passing therethrough in alignment with the axis thereof, and comprising, in combination: stacking the plates to form a plurality of stacked units having substantially an equal number of plates in each unit; moving the plates through the coil by feeding the stacked units consecutively therethrough; energizing said coil with a source of alternating current at a frequency selected according to the major dimension of said plates; and supporting each of said plates while moving through said coil in a position transversely of magnetic flux passing therethrough to provide generation of circulating eddy currents substantially in the planes of the major surfaces of said plates.

2. The method of simultaneously inductively heating a plurality of substantially identical sheet metal plates with an open core induction heating coil adapted to generate a magnetic flux passing therethrough in alignment with the axis thereof, and comprising, in combination: supporting the coil to dispose the axis thereof substantially vertically; stacking the plates to form a plurality of stacked units having substantially an equal number of plates in each unit; feeding the stacked units consecutively to one end of said coil; consecutively moving a plurality of stacked units substantially as a column of stacked plates through and beyond said coil; consecutively removing substantially a predetermined number of plates from a position beyond said coil as a stacked unit; energizing said coil with a source of alternating current at a frequency selected according to the major dimension of said plates; said plates being supported while moving through said coil in a position transversely of magnetic flux passing therethrough to provide generation of circulating eddy currents substantially in the plane of the major surfaces of said plates.

3. The method of simultaneously inductively heating a plurality of substantially identical sheet metal plates with an open core induction heating coil adapted to generate a magnetic flux passing therethrough in alignment with the axis thereof, and comprising, in combination: supporting the coil to dispose the axis thereof substantially vertically; stacking the plates to form a plurality of stacked units having substantially an equal number of plates in each unit; feeding the stacked units consecutively to one end of said coil; consecutively moving a plurality of stacked units substantially as a column of stacked plates through and beyond said coil; consecutively removing substantially a predetermined number of plates from a position beyond said coil as a stacked unit; energizing said coil with a source of alternating current at a frequency selected according to the major dimension of said plates; said plates being supported while moving through said coil in a position transversely of magnetic flux passing therethrough to provide generation of circulating eddy currents substantially in the plane of the major surfaces of said plates, said plates being moved in a direction upwardly through said coil.

4. The method of simultaneously inductively heating a plurality of substantially identical thin sheet metal plates with an open core induction heating coil adapted to generate a magnetic flux passing therethrough in alignment with the axis thereof, and comprising, in combination: stacking the plates to form a plurality of stacked units having substantially an equal number of plates in each unit; moving the plates through the coil by feeding the stacked units consecutively therethrough; energizing said coil with a source of alternating current at a frequency selected according to the major dimension of said plates; and supporting each of said plates while moving through said coil in a position transversely of magnetic flux passing therethrough to provide generation of circulating eddy currents substantially in the planes of the major surfaces of said plates.

ROBERT SIDNEY SEGSWORTH.

References Cited in the file of this patent

UNITED STATES PATENTS

| Number | Name | Date |
|---|---|---|
| 1,912,214 | Northrup | May 30, 1933 |
| 2,448,099 | Baker | Aug. 31, 1948 |
| 2,454,039 | Cox | Nov. 16, 1948 |
| 2,465,306 | Durand | Mar. 22, 1949 |
| 2,477,129 | Johnson | July 26, 1949 |